(12) United States Patent
Zhao et al.

(10) Patent No.: US 10,003,925 B1
(45) Date of Patent: Jun. 19, 2018

(54) LOW-POWER DEVICE POSITIONING METHOD USING POSITION UPDATES CALCULATED BY LOW POWER PROCESSOR

(71) Applicant: MARVELL INTERNATIONAL LTD., Hamilton (BM)

(72) Inventors: Xing Zhao, Santa Clara, CA (US); Thandapani Venkataramani, Fremont, CA (US); Xin Zhang, Shanghai (CN); Zhike Jia, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 387 days.

(21) Appl. No.: 14/700,216

(22) Filed: Apr. 30, 2015

Related U.S. Application Data

(60) Provisional application No. 61/986,575, filed on Apr. 30, 2014.

(51) Int. Cl.
*H04W 64/00* (2009.01)
*H04W 4/02* (2018.01)
*H04W 52/02* (2009.01)
*H04W 4/04* (2009.01)

(52) U.S. Cl.
CPC ........ *H04W 4/027* (2013.01); *H04W 4/021* (2013.01); *H04W 4/023* (2013.01); *H04W 4/04* (2013.01); *H04W 52/0209* (2013.01)

(58) Field of Classification Search
CPC .................................................... H04W 64/00
See application file for complete search history.

(56) References Cited

U.S. PATENT DOCUMENTS

| 2013/0238700 A1* | 9/2013 | Papakipos ............... G06F 21/81 709/204 |
| 2013/0244686 A1* | 9/2013 | Saha ..................... G06F 1/3206 455/456.1 |
| 2014/0094198 A1* | 4/2014 | Heo ................... H04W 52/0274 455/456.4 |

\* cited by examiner

*Primary Examiner* — Vladimir Magloire
*Assistant Examiner* — Frank Donado

(57) ABSTRACT

Systems, methods, and other embodiments are described. In one embodiment, a system is provided that includes a first processor configured to, in response to a first request for a location of a device, determine a first location of the device, and provide the first location as the location of the device. The system includes a second processor with position update logic configured to, in response to a second request for a location of the device, determine whether the device has moved from the first location. When the device has not moved from the first location the second processor is configured to provide the first location. When the device has moved from the first location, the second processor is configured to determine a second location of the device using less power than the first processor in determining the first location and provide the second location as the location of the device.

17 Claims, 5 Drawing Sheets

LOW-POWER DEVICE POSITIONING METHOD USING POSITION UPDATES CALCULATED BY LOW POWER PROCESSOR

CROSS REFERENCE TO RELATED APPLICATIONS

This patent disclosure claims the benefit of U.S. Provisional Application Ser. No. 61/986,575 filed on Apr. 30, 2014, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Wireless communication devices (hereinafter "device" or "devices") such as smart phones and tablets are typically "location aware," meaning that the device is capable of determining its position or location. A location of a device can be used as an input by navigation applications, social networking applications, location based service (LBS) applications, and so on. Most location aware devices calculate their location using measurements obtained from a satellite navigation system. A satellite navigation system is a system of satellites that permits an electronic receiver to calculate a location (e.g., longitude, latitude, altitude) to a high precision (within a few meters) using time signals transmitted from one or more satellites. A satellite navigation system with a global coverage is commonly referred to as a global navigation satellite system (GNSS). Example global navigation satellite systems include the Global Positioning system (GPS), the Global Navigation Satellite System (GLONASS), the Galileo satellite navigation system, and the Beidou satellite navigation system. A location of a device can also be determined based on the location of nearby cellular communication towers and/or wireless fidelity (WiFi) access points and/or other wireless signals (WiFi, Bluetooth, or Zigbee). Often, data from more than one source (e.g., a satellite system and a WiFi system) is combined to determine or calculate a location of the device.

SUMMARY

In general, in one aspect this specification discloses a system configured to be implemented within a device. The system includes a first processor and a second processor configured to consume less power than the first processor. The first processor is configured to, in response to a first request for a location of the device, i) determine a first location of the device, and (ii) provide the first location as the location of the device responsive to the first request. The second processor includes position update logic configured to cause the second processor to, in response to a second request for a location of the device, determine whether the device has moved from the first location. In response to the second processor determining that the device has not moved from the first location determined by the first processor, the second processor is configured to provide the first location as the location of the device responsive to the second request. In response to the second processor determining that the device has moved from the first location determined by the first processor, the second processor is configured to determine a second location of the device. The second processor determines the second location of the device using less power than that consumed by the first processor in the determining the first location due to the second processor being configured to consume less power than the first processor. The second processor is configured to provide the second location as the location of the device responsive to the second request.

In general, in another aspect, this specification discloses a method that provides the location of a device. The method includes, in response to a first request for a location of a device, with a first processor i) determining a first location of the device, and (ii) providing the first location as the location of the device responsive to the first request. In response to a second request for a location of the device, the method includes with a second processor determining whether the device has moved from the first location. When the device has not moved from the first location determined by the first processor, the method includes with the second processor providing the first location as the location of the device responsive to the second request. When the device has moved from the first location determined by the first processor, the method includes with the second processor determining a second location of the device. The second processor determines the second location of the device using less power than that consumed by the first processor in the determining the first location due to the second processor being configured to consume less power than the first processor. The method includes with the second processor providing the second location as the location of the device responsive to the second request.

In general, in another aspect, this specification discloses a device that provides a location of the device on request. The device includes one or more sensors configured to monitor respective aspects of the device and output position-related data describing the monitored aspects. The device includes an application processor configured to, in response to a first request for a location of the device, (i) determine a first location of the device, and (ii) provide the first location as the location of the device responsive to the first request. The device includes a low power processor configured to consume less power than the application processor. The low power processor includes position update logic configured to cause the low power processor to, in response to a second request for a location of the device, determine whether the device has moved from the first location. In response to the low power processor determining that the device has not moved from the first location determined by the application processor, the low power processor is configured to provide the first location as the location of the device responsive to the second request. In response to the low power processor determining that the device has moved from the first location determined by the application processor, the low power processor is configured to determine a second location for the device. The low power processor calculates the second location of the device using less power than that consumed by the application processor in determining the first location due to the low power processor being configured to consume less power than the first processor.

BRIEF DESCRIPTION OF THE DRAWINGS

The accompanying drawings, which are incorporated in and constitute a part of the specification, illustrate various systems, methods, and other embodiments of the disclosure.

Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Geofencing is a technique used to detect devices present within a given perimeter of a point of interest (POI). As used herein, a "geofence region" is the area defined by the geofence perimeter around a POI. Some security based geofencing applications detect the removal of devices from a geofence region or entry of unauthorized devices into a geofence region. To detect devices in a geofence region, a geofence application periodically obtains the location of all devices serviced by the geofencing application. Instead of communicating directly with devices, the geofencing application may contact a third party provider of device locations to determine a location of a device.

Figure 1:
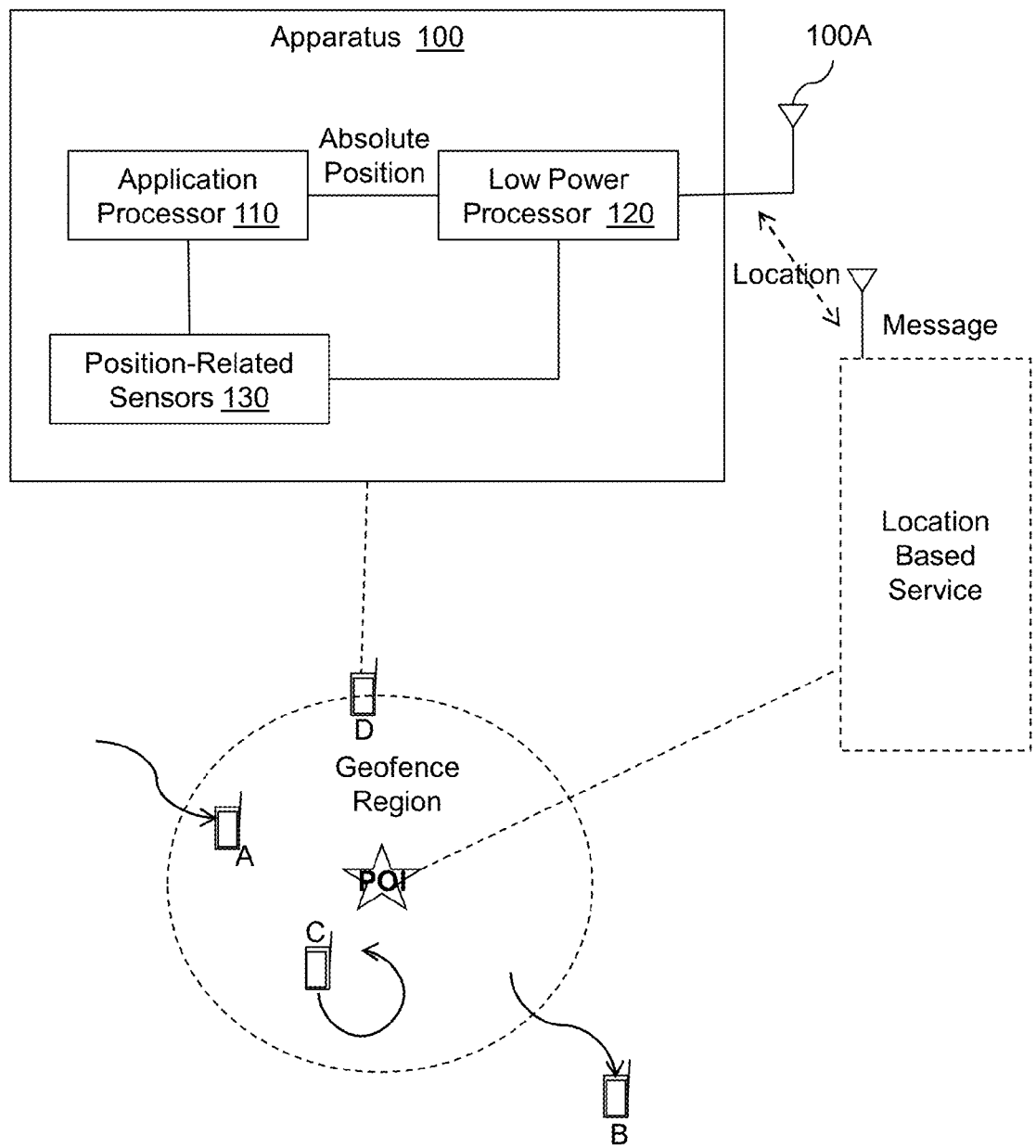
FIG. 1 illustrates one embodiment of an apparatus associated with low power device position determination.

A location based service (LBS) is a particular geofencing application that detects devices within the geofence region for the purpose of communicating with users of the devices while they are proximate the POI (e.g., within the geofence region). Device users can subscribe to location based service offered by a given retailer or service provider in return for receiving offers or information. FIG. 1 illustrates geofencing as performed by four wireless communication devices A-D and a location based service. The devices are periodically contacted by the location based service and requested to provide their location to the application. Each device's location is compared to the geofence region to determine if the device is within the geofence region.

The location based service sends one or more messages to a device when the device is determined to be within a geofence region around the POI, which is associated with, for example, a retailer or service provider. The content of the message may differ depending on whether a user is determined to be entering, exiting, dwelling within, or uncertain about the geofence region. Thus many LBSs determine a given device's trajectory based on a series of location data about the device, rather than simply determining that the device is inside or outside the geofence region at a single point in time. In FIG. 1, the trajectories of the four devices are shown by the arrows by the devices. It can be seen that device A has just entered the geofence region while device B has just exited the geofence region. Device C is moving or "dwelling" within the geofence region. Device D is stationary in a location on the boundary of the geofence region, which is interpreted by many location based services as meaning that the user is "uncertain" about visiting the POI.

For example, a coffee shop chain offering a location based service might send subscribing device A an SMS message containing a coupon because the device has entered the geofence region around one of the coffee shop's locations (i.e., the POI). The location based service may send subscribing device B an SMS message communicating the location of the next nearest coffee stop location because the the device B has exited the geofence region. The coffee shop location based service may send subscribing device C an SMS message that communicates the expected wait time for a coffee in the coffee shop because the device is dwelling within the geofence region. The coffee shop LBS may send subscribing device D an SMS message that includes a more enticing offer or other content aimed at convincing a user of device D that they should decide to visit the coffee shop.

Geofencing applications rely on accurate, up to date, location information from a device and often determine a trajectory of a device based on a series of determined locations of the device. To this end, geofencing applications typically poll devices for the devices' locations very frequently. This means that devices are being called on more and more frequently to determine their location, which consumes significant power and may lead to unsatisfactory battery life. Also, a device may traverse through a plurality of independent geofence regions (e.g., while a user is shopping within a mall), and consequently the device my respectively receive a plurality of requests from a plurality of location based services for a location of the device.

Described herein are examples of systems, methods, and other embodiments associated with reducing the power that is consumed by a device frequently determining its location as the device passes through a relatively small area, such as a geofence region. FIG. 1 illustrates one embodiment of an apparatus 100 that is configured to reduce power consumed while the apparatus 100 determines a location of an apparatus in response to requests from a geofencing application such as the location based service of FIG. 1. Any or all of the devices A-D in the geofencing example of FIG. 1 may be embodied as the apparatus 100. The apparatus 100 includes a first processor (e.g., an application processor 110) and a second processor (e.g., low power processor 120) that consumes less power than the first processor. The power consumption of the application processor as compared to the low power processor varies based on the particular design. For example, in one embodiment the application processor is a single/double/quad/octal core processor clocked at a frequency greater than 1 GHz. The low power processor is an ARM Cortex CM0/CM0+/CM3/CM4 running at tens of MHz clock speed. In in one embodiment, the low power processor consumes less than 10% of the power of the application processor.

The application processor 110 is capable of determining an absolute position of the apparatus 100. The low power processor 120 that is capable of determining a change in the position of the apparatus relative to the absolute position of the apparatus. For the purposes of this description, the term absolute position means the position or location of the device determined by the application processor using data from a global navigation satellite system and possibly data from other sources such as WiFi and so on.

To conserve power, the application processor 110 is used to determine the apparatus's absolute position as infrequently as possible. Whenever appropriate, the apparatus's location is calculated by updating the apparatus's absolute position without using the application processor. This is accomplished by updating the absolute position with a change in the apparatus's relative position that is determined by the low power processor 120. In this manner, the low power processor 120 performs many of the position related calculations so that the use of the application processor is limited and power is conserved.

Figure 2:
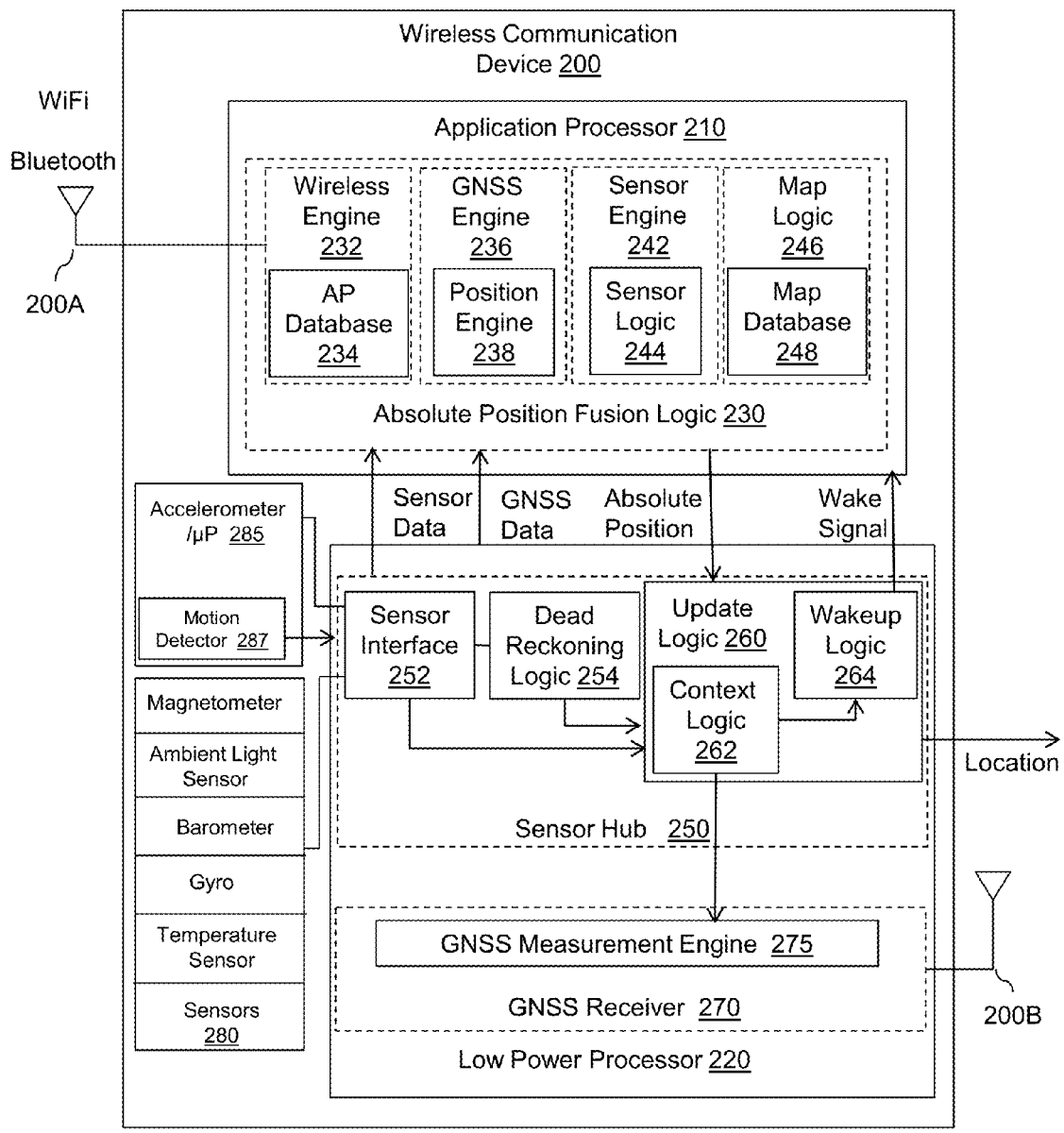
FIG. 2 illustrates one embodiment of a wireless device configured to conserve power while determining its location.

FIG. 2 illustrates one embodiment of a wireless communication device 200 that is configured to determine its location in a manner that conserves power. The device 200 includes an application processor 210, a low power processor 220, a plurality of sensors 280, and an accelerometer that includes an embedded microprocessor 285. The application processor 210 includes absolute position fusion logic 230 that determines a fusion absolute position of the device 200 based on data from a number of sources. In one embodiment, the application processor has a rated current draw of 100 mA, and the low power processor has a rated current draw of 5 mA. Thus, the power consumed by the application processor while determining the absolute position will be much greater than the power consumed by the low power processor when updating the absolute position.

A wireless engine 232 receives wireless local area network (WLAN) signals, e.g., WiFi radio signals and/or Bluetooth radio signals, by way of an antenna 200A, and determines the device's position based on those signals. In one embodiment, the wireless engine 232 includes an access point (AP) database 234 that stores location information for access points that transmit the radio signals. The wireless engine uses this AP location data in conjunction with the strength of signals received from various access points to determine the device's location.

A GNSS engine 236 receives GNSS measurement data from a GNSS measurement engine 275 in the low power processor 220. The GNSS measurement data is determined based on time signals received from GNSS satellites by a GNSS receiver 270 using an antenna 200B. The GNSS receiver 270 is also integrated with the low power processor 220. In the illustrated embodiment the GNSS receiver 270 and GNSS measurement engine 275 are integral to the low power processor 220 so that GNSS measurements continue to be made when the application processor 210 is asleep. In other embodiments one or both of the GNSS receiver 270 and the GNSS measurement engine 275 may be integrated with a different processor. The GNSS engine 236 includes a position engine 238 configured to determine the device's position based on the GNSS measurement data.

The absolute position fusion logic 230 includes a sensor engine 242 with sensor logic 244. The sensor engine 242 inputs data from the sensors 280 and/or the accelerometer with embedded microprocessor 285. In the illustrated embodiment, the sensor data is provided by a sensor hub 250 that is integral to the low power processor 220. The sensor hub includes a sensor interface 252 that receives sensor data sent from the sensors 280 and accelerometer and embedded microprocessor 285 according to some protocol such as inter-integrated circuit communication (I2C) or serial-peripheral interface (SPI). Because the sensor hub 250 is part of the low power processor, the sensor hub continues to receive and process sensor data even when the application processor 210 is asleep.

The sensors 280 and accelerometer/microprocessor 285 monitor various aspects of the device and output data describing the various aspects. The sensors 280 include a three-axis magnetometer, an ambient light sensor, a barometer, a three-axis gyroscope, and a temperature sensor. A three-axis accelerometer 285 is illustrated as including an integral microprocessor that acts independently from the low power processor 220. Additional power savings can be realized by using such an arrangement as will be described in more detail below. In some embodiments, the accelerometer does not include a microprocessor and is simply another sensor that provides data to the sensor interface 252. Of course, other embodiments may include more or less sensors than those illustrated in FIG. 1. The sensor logic 244 is configured to determine the device's position based on a fusion of the data from one or more of the various sensors as provided by the sensor hub 250 to the sensor engine 242.

Map logic 246 is configured to determine the device's position as a position identified by a user interacting with a map displayed on the device. A map database 248 stores map data used to generate the map. The absolute position fusion logic 230 combines the positions determined by the wireless engine 232, the GNSS engine 236, the sensor engine 242, and the map logic 246 to calculate an absolute position of the device. In one embodiment, the absolute position fusion logic 230 employs a Kalman filter to combine the different positions to calculate the absolute position of the device. This "fusion" absolute position is provided to update logic 260 in the low power processor 220. Once the absolute position has been provided to the low power processor 220, the application processor 210 transitions to a sleep or other low power mode.

While the application processor 210 sleeps, the update logic 260 propagates the device's location by updating the absolute position using position-related data from the sensors 280 and accelerometer 285. Dead reckoning logic 254 inputs sensor data from the sensor interface 252 and uses dead reckoning to determine a device's trajectory (e.g., a distance traveled and a direction of travel). The trajectory is added to the most recent location to determine the updated location for the device. In one embodiment, the position-related data used by the update logic also includes raw GNSS measurements of pseudo range and Doppler range change from the GNSS measurement engine 275.

Figure 3B:
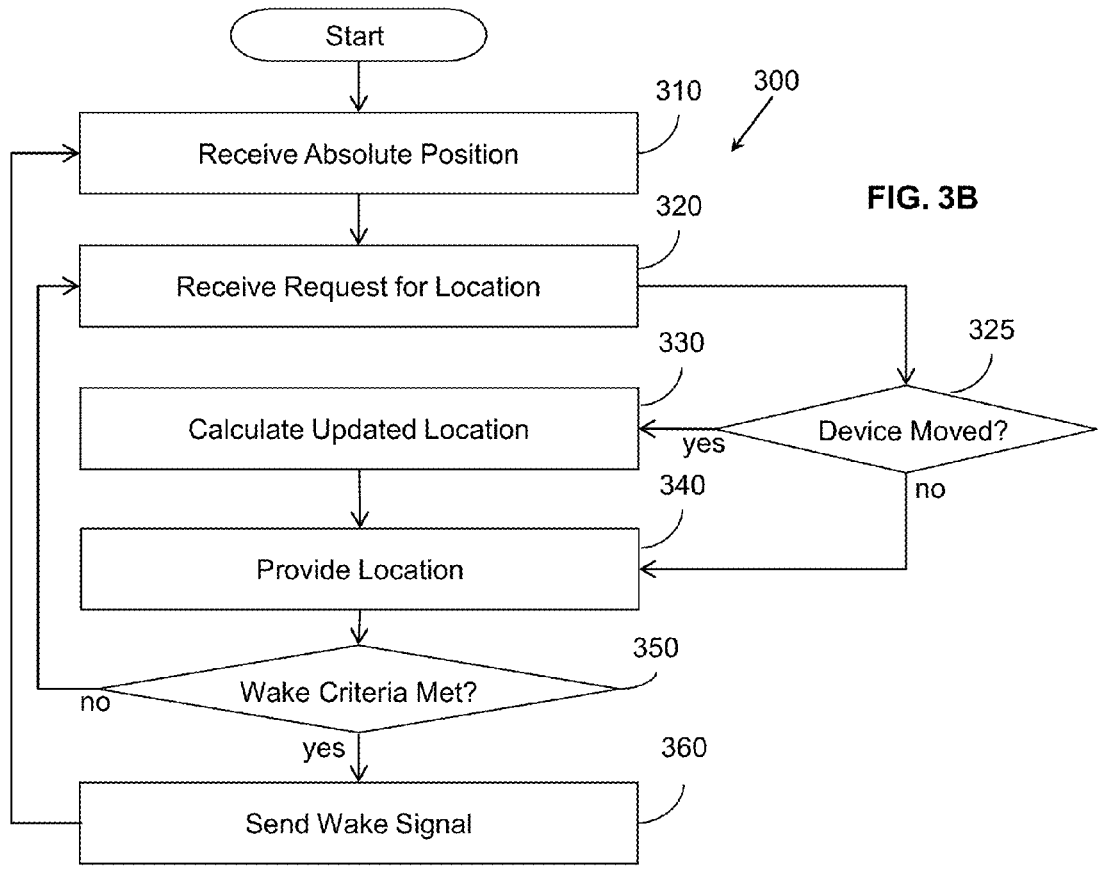
FIG. 3B illustrates one embodiment of a method performed by a low power processor to conserve power while determining a device location.
Figure 3A:
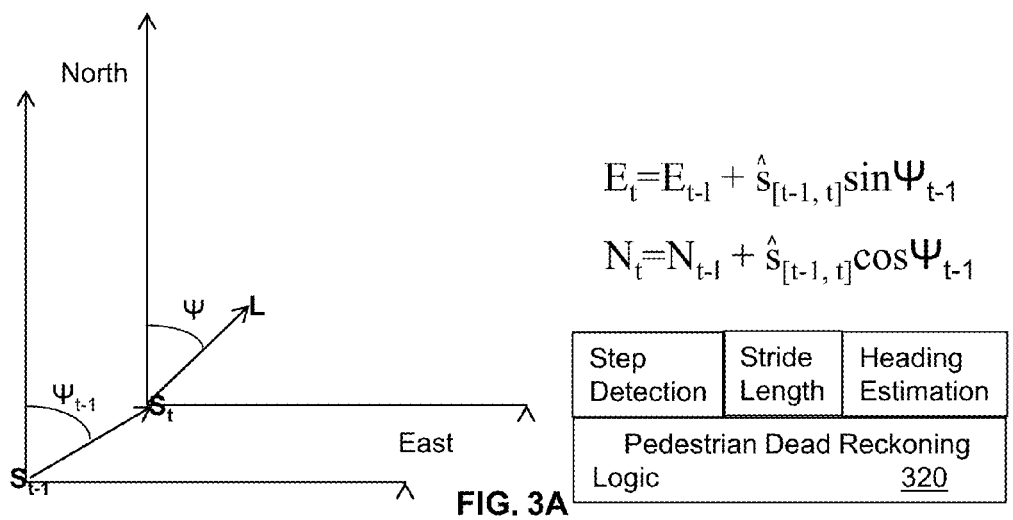
FIG. 3A illustrates one example of how dead reckoning can be used to update an absolute position.

FIG. 3A illustrates one example of how dead reckoning can be performed by the dead reckoning logic 254. The dead reckoning logic 254 accesses pedestrian dead reckoning logic 320 in the device. The pedestrian dead reckoning logic 320 may be calibrated for the user of the device or may make calculations based on data that is representative of a typical user. The pedestrian dead reckoning logic 320 includes a step detection function that provides a signal each time sensor data indicates that the user has taken a step. Accelerometer data is typically used to detect a user's step. The pedestrian dead reckoning logic 320 also provides stride length estimation that estimates the length of a stride. The stride length estimate is made based on a calibrated length of the device's user's stride or an average user stride length and the time between steps (e.g., faster steps are typically shorter while slower steps are longer). The heading estimation is an estimation of the user's heading determined based on accelerometer, magnetometer, and gyroscope data.

The diagram in FIG. 3A shows two steps taken by a user at times t−1 and t ($S_t$, $S_{t-1}$). The magnitude of the vector from $S_{t-1}$ to $S_t$, denoted as $\hat{S}_{t-1,t}$, is determined to be the estimated stride length. The angle $\Psi_{t-1}$ is determined using magnetometer and/or gyroscope data. For each step, the user's position is estimated by updating the user's position after a prior step (denoted by the coordinates $E_{t-1}$ and $N_{t-1}$). The user's position after step $S_{t-1}$ may have been estimated from an earlier prior step $S_{t-2}$. The user's position after step $S_{t-1}$ may correspond to a newly calculated absolute position from the application processor. The equations shown in FIG. 3A are used by the dead reckoning logic 254 to determine the user's new Eastern coordinate $E_t$ and Northern coordinate $N_t$ after the user has taken step $S_t$. In this manner, the device's position is updated using dead reckoning for each step the user takes. The update logic 260 outputs the updated position as the device's location for use by a geofencing application.

FIG. 3B illustrates one embodiment of a method 300 that can be performed by the update logic 260 (FIG. 2) to determine the location of the device 200 (FIG. 2) by updating an absolute position received from the application processor 210 (FIG. 2). At 310, the low power processor receives an absolute position received from the application processor. Recall that after sending the absolute position, the application processor will go to sleep. At 320, the low power processor receives a request for the device's location. At 325, a determination is made as to whether the device has moved with respect to the absolute position. For example, sensor data may be checked to see if motion has been detected since the absolute position was received and/or a time that has elapsed since the absolute position was received may be compared to some threshold. If the device has not moved, the low power processor reports the absolute position as the location of the device at 340. If the device has moved at 330, the low power processor calculates an updated position based, at least in part, on the absolute position and the position-related data. In one embodiment, the low power processor uses position-related data to determine a change in the relative position of the device to the absolute position. The change in the relative position is added to the absolute position to calculate the updated location of the device. In one embodiment, dead reckoning is used to determine the change in relative position. At 340 the updated position is provided as the device's location to a geofencing application.

At 350, until certain wake criteria are met, the low power processor continues to input position-related data at 320, calculate an updated position at 330, and provide the updated position as the device's location at 340. When the wake criteria are met, at 360 the update logic 260 sends a wake signal to the application processor 210 so that the application processor 210 can calculate a new absolute position for use by the update logic 260 in determining the location of the device. In one embodiment, at 360 the low power processor sends any data (e.g., sensor data, GNSS measurement data) required by the application processor to calculate the absolute position so that the application processor can immediately make the calculation and return to sleep. Examples of wake criteria will be described below.

Figure 4:
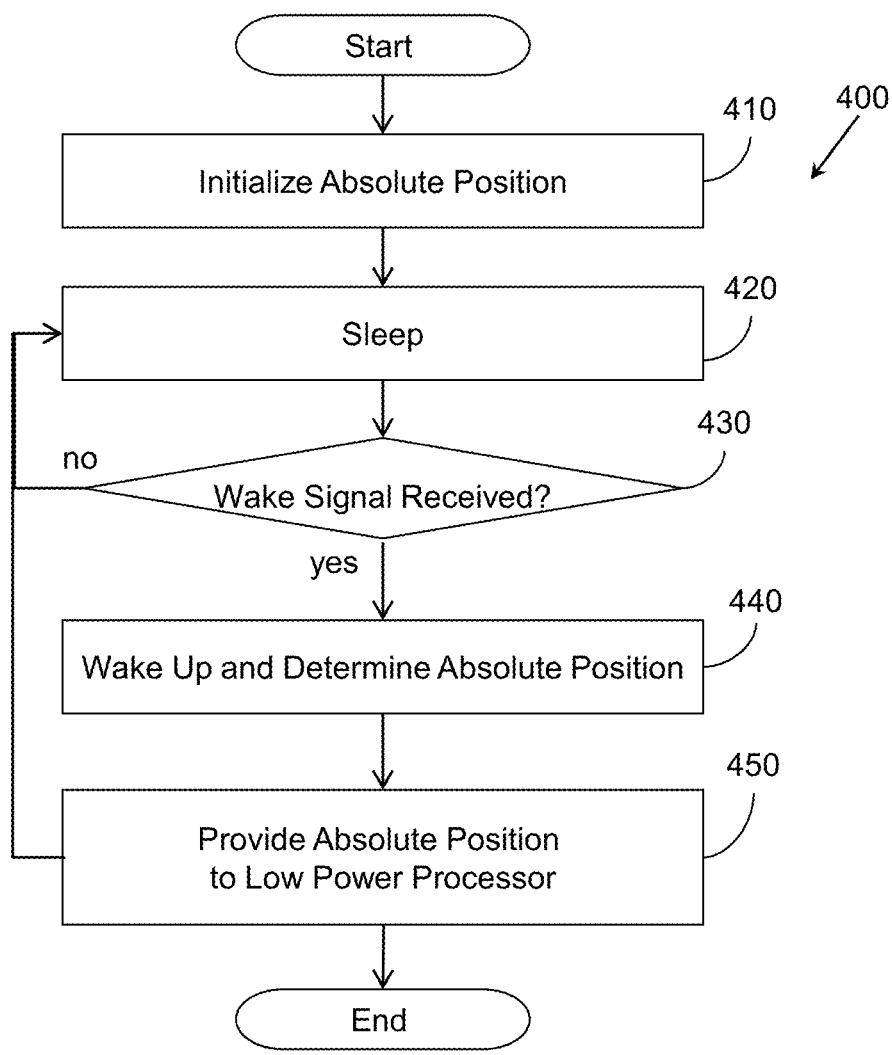
FIG. 4 illustrates one embodiment of a method performed by an application processor to conserve power while determining a device location.

FIG. 4 illustrates one embodiment of a method 400 that is performed by the application processor 210 (FIG. 2) to determine an absolute position of a device only when called on to do so by the low power processor 220 (FIG. 2). At 410, the application processor initializes the absolute position by determining the absolute position as described above with reference to FIG. 2. Recall that calculating the absolute position involves combining positions calculated in several different ways (e.g., wireless signals, GNSS measurements, sensors, map matching, and so on). Positions determined by one or more of the techniques described in FIG. 2 may be used to calculate the absolute position.

At 420, the application processor enters sleep mode or any other power saving mode. At 430, until a wake signal is received from the low power processor, the application processor remains asleep. When a wake signal is received from the low power processor, at 440 the application processor wakes up and determines the absolute position of the device. At 450, the application processor provides the absolute position to the low power processor and goes back to sleep at 420 until a subsequent wake signal is received. Note the the method 400 maximizes the amount of time that the application processor is asleep, conserving power.

Returning to FIG. 2, the update logic 260 includes context logic 262 and wakeup logic 264. The context logic 262 uses sensor data from the sensor interface 252 and/or a trajectory calculated by the dead reckoning logic 254 to determine a context that describes one or more aspects of the device's surroundings or present manner of use. For example, the context logic 262 may determine that the device is indoors based on data from the ambient light sensor and temperature sensor as well as GNSS signal strength. The context logic 262 may determine a user's motion context, which indicates whether the user is stationary, walking, or in a vehicle based on data from the accelerometer 285.

The wakeup logic 264 determines whether wake criteria have been met, and when the criteria are met sends the wake signal to the application processor 210. The wakeup logic 264 evaluates data from the sensor interface 252, dead reckoning logic 254, and context logic 262 to determine if the wake criteria have been met. In one embodiment, the wake criteria is simply a duration of time that has elapsed since the last time the wake signal was sent to the application processor. Any number of wake criteria may be appropriate. For example, the wake criteria may specify that the wake signal is only sent when the device is in motion. The wake criteria may specify that the wake signal should be sent after a predetermined distance has been traversed or a certain number of steps have occurred since the last wake signal was sent. The wake signal may be sent more often when the device is in a vehicle than when the user of the device is walking.

The wake criteria may specify that the wake signal should be sent when the device's trajectory indicates that the user is close to a boundary of the geofence region. The wake criteria may specify that the wake signal should be sent less often when the device is dwelling within the geofence region. The wake criteria may specify that if the device's trajectory is in the same direction for some period of time, the wake signal should be sent because it is likely that the user will cross a boundary of the geofence region. The wake criteria are tailored to wake the application processor as infrequently as possible while maintaining acceptable accuracy when a device is in a geofence region.

Additional power savings can be realized when the accelerometer includes an embedded microprocessor as shown in FIG. 2. The accelerometer/microprocessor 285 includes a motion detector 287 that sends a wake signal to the low power processor 220 when motion is detected. In one embodiment the accelerometer/microprocessor 285 sets internal registers based on acceleration data and when the content of the registers exceeds some predetermined value, the wake signal is sent to the low power processor 220. In one embodiment, the embedded microprocessor is an ARM processor that has a rated current draw of 10 μA in low-power motion sensor monitoring mode. When the context logic 262 determines that the user is stationary, the low power processor 220 can be placed in sleep mode until the wake signal is received from the motion detector 287, resulting in power savings.

Another power saving feature that can be provided by the context logic 262 is context-based control of the GNSS measurement engine 275. Using context information from the context logic 262, the GNSS measurement engine 275 controls the operation of the GNSS receiver 270 based, at least in part, on whether the device is indoors or outdoors and/or whether the device is in motion. This context-based GNSS control is provided in recognition of the fact that GNSS measurement accuracy and acquisition times vary significantly depending on whether the device is indoors or outdoors. Outdoors GNSS measurements can be quickly acquired and provide good accuracy. In contrast, indoors it may be difficult or impossible to acquire GNSS measurements, resulting in increased power consumption as the GNSS receiver attempts to acquire GNSS measurements.

The context logic 262 controls the GNSS engine 275 to operate the the GNSS receiver according to one of three duty cycles or to put the GNSS receiver into sleep mode. A continuous mode duty cycle specifies that the GNSS receiver continuously acquire GNSS measurements. An outdoor duty cycle specifies that the GNSS receiver acquire GNSS measurements for a relatively short acquisition time (e.g., 3 seconds in one embodiment) and then cease acquiring measurements for a relatively short quiet time (e.g., 60 seconds in one embodiment). The outdoor duty cycle has a relatively short acquisition time because GNSS measurements can be quickly acquired. An indoor duty cycle specifies that the GNSS receiver acquire GNSS measurements for a relatively longer acquisition time (e.g., 6 seconds in one embodiment) and then cease acquiring measurements for a relatively longer quiet time (e.g., 240 seconds in one embodiment). The indoor duty cycle has a relatively long acquisition time because it typically takes longer to acquire measurements indoors and a relatively long quiet time in recognition of the increased power drain in acquiring a signal indoors. The context logic 262 controls the GNSS engine 275 to put the GNSS receiver 270 into sleep mode whenever the device is stationary. When the device is moving, the context logic 262 activates the GNSS receiver according to either the indoor duty cycle or the outdoor duty cycle depending on the device's surroundings. Compared to leaving the GNSS receiver in continuous mode all the time, significant power savings can be realized.

Figure 5:
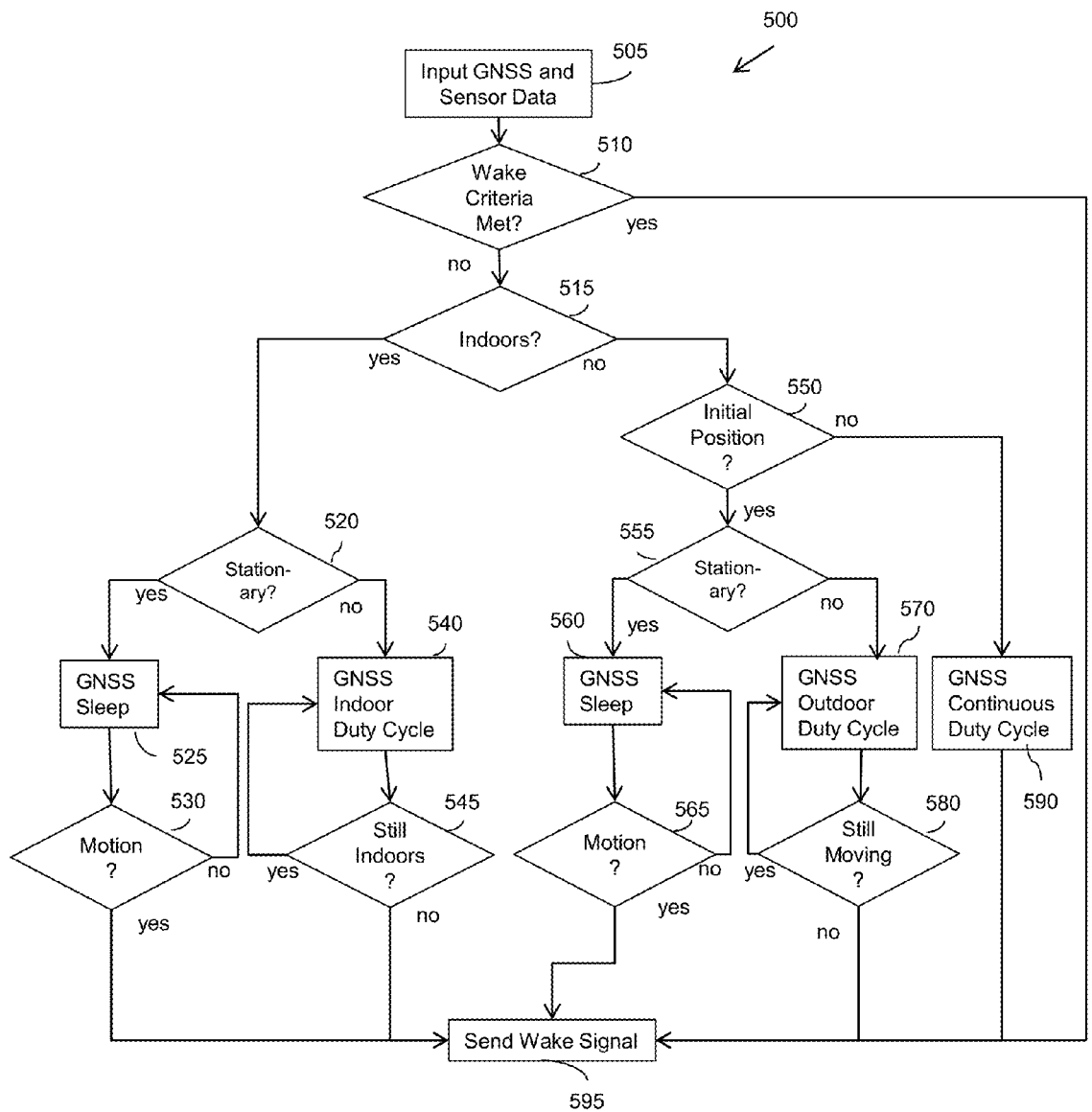
FIG. 5 illustrates one embodiment of a method associated with determining when to send a wake signal to an application processor.

FIG. 5 illustrates one embodiment of a context-based control method 500 that may be performed by the context logic 262 to send the wake signal to the application processor based on the device's context. At 505, GNSS data and sensor data are input for use in determining the device's context. At 510 a determination is made as to whether any of the wake criteria are met. If so, the wake signal is sent at 595. If none of the wake criteria are met, at 515 a determination is made as to whether the device is indoors. If the device is indoors, at 520 a determination is made as to whether the device is stationary. If the device is stationary, at 525 the GNSS receiver is put into sleep mode. At 530 the GNSS receiver will remain in sleep mode until motion is detected. When motion is detected at 530, the wake signal is sent at 595. If the device is indoors but not stationary, at 540 the GNSS receiver is put into the indoor duty cycle and at 545 the GNSS receiver will remain in the indoor duty cycle until the device goes outside. When it is determined at 545 that the device goes outside, the wake signal is sent at 595.

If the device is determined to be outdoors at 515, at 550 a determination is made as to whether the device needs an initial absolute position (e.g., has just entered geofencing mode). If the device needs an initial absolute position, at 590 the GNSS receiver is placed in continuous duty and at 595 the wake signal is sent. If the device is outdoors and the device is not calling for an initial absolute position, at 555 a determination is made as to whether the device is stationary. If the device is stationary, at 565 the GNSS receiver is put into sleep mode. At 565 the GNSS receiver will remain in sleep mode until motion is detected. When motion is detected at 565, the wake signal is sent at 595. If the device is outdoors but not stationary, at 570 the GNSS receiver is put into the outdoor duty cycle and at 580 the GNSS receiver will remain in the indoor duty cycle until the device stops moving. When it is determined at 580 that the device stops moving, the wake signal is sent at 595.

It can be seen from the foregoing description that significant power savings can be achieved by selectively activating the application processor to periodically determine a device's absolute position while relying on the low power processor to propagate the position while the application processor sleeps. Further power savings can be realized by providing an embedded microprocessor in the accelerometer that can wake up the low power processor when the device begins moving. Even further power savings can be realized by selectively controlling the GNSS receiver to sleep or operate according to a context-based duty cycle.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. A system configured to be implemented within a device, the system comprising:
a first processor configured to, in response to a first request for a location of the device, i) determine a first location of the device, and (ii) provide the first location as the location of the device responsive to the first request;
a second processor configured to consume less power than the first processor; and
position update logic configured to cause the second processor to, in response to a second request for a location of the device, determine whether the device has moved from the first location,
wherein in response to the second processor determining that the device has not moved from the first location determined by the first processor, the second processor is configured to provide the first location as the location of the device responsive to the second request,
wherein in response to the second processor determining that the device has moved from the first location determined by the first processor, the second processor is configured to determine a second location of the device, wherein the second processor determines the second location of the device using less power than that consumed by the first processor in the determining the first location due to the second processor being configured to consume less power than the first processor, further wherein the second processor is configured to provide the second location as the location of the device responsive to the second request;
wherein the first processor is configured to i) determine whether the device is stationary or moving based, at least in part, on position-related data, and ii) in response to determining that the device is stationary, enter a sleep state;
a sensor configured to:
detect motion of the device; and
output sensor data describing the motion; and
a third processor configured to:
input the sensor data; and
in response to sensor data that indicates that the device is in motion, send a wake signal to the first processor.

2. The system of claim 1, wherein the position update logic comprises wake logic configured to, when a wake criteria is met, send a second wake signal to the second processor.

3. The system of claim 2, wherein the wake criteria comprises determination of a second position that is within a predetermined proximity to a given boundary.

4. The system of claim 2, wherein the wake criteria comprises detection of a predetermined number of steps taken by a user of the device.

5. The system of claim 2, wherein the wake criteria comprises determining that the device has traveled a predetermined distance in a same direction.

6. The system of claim 1, further comprising:
a Global Navigation Satellite System (GNSS) receiver configured to acquire GNSS measurements used to calculate the absolute position of the device,
wherein the position update logic is configured to:
set a first duty cycle according to which the GNSS receiver acquires GNSS measurements when the device is outdoors;
set a second duty cycle according to which the GNSS receiver acquires GNSS measurements when the device is indoors; and
wherein the first duty cycle specifies that the GNSS receiver acquires GNSS measurements more frequently than the second duty cycle.

7. The system of claim 6, wherein the second processor comprises the GNSS receiver and the second processor transmits the GNSS measurements to the first processor for use in determining the first location of the apparatus.

8. A method, comprising:
in response to a first request for a location of a device, with a first processor i) determining a first location of the device, and (ii) providing the first location as the location of the device responsive to the first request;
in response to a second request for a location of the device, with a second processor determining whether the device has moved from the first location,
when the device has not moved from the first location determined by the first processor, with the second processor providing the first location as the location of the device responsive to the second request, and
when the device has moved from the first location determined by the first processor, with the second processor determining a second location of the device, wherein the second processor determines the second location of the device using less power than that consumed by the first processor in the determining the first location due to the second processor being configured to consume less power than the first processor;
with the second processor providing the second location as the location of the device responsive to the second request;
with the first processor calculating the absolute position using Global Navigation Satellite System (GNSS) measurements acquired by a GNSS receiver; and
with the second processor controlling the GNSS receiver by:
setting a first duty cycle according to which the GNSS receiver acquires GNSS measurements when the device is outdoors;

setting a second duty cycle according to which the GNSS receiver acquires GNSS measurements when the device is indoors; and wherein the first duty cycle specifies that the GNSS receiver acquires GNSS measurements more frequently than the second duty cycle.

9. The method of claim 8, comprising with the second processor:

determining that a wake criteria is met; and waking the first processor in response to determining that the wake criteria is met.

10. The method of claim 9, wherein the wake criteria comprises detection of a predetermined number of steps taken by a user of the device.

11. The method of claim 9, wherein the wake criteria comprises a determination that the device has traveled a predetermined distance in a same direction.

12. The method of claim 8, further comprising with the second processor:

determining whether the device is stationary or moving based, at least in part, on the position-related data;

in response to determining that the device is stationary, entering a sleep state; and in response to sensor data that indicates that the device is in motion, waking up.

13. A device, comprising:

one or more sensors configured to monitor respective aspects of the device and output position-related data describing the monitored aspects;

an application processor configured to, in response to a first request for a location of the device, (i) determine a first location of the device, and (ii) provide the first location as the location of the device responsive to the first request;

a low power processor configured to consume less power than the application processor, wherein the low power processor comprises:

position update logic configured to cause the low power processor to, in response to a second request for a location of the device, determine whether the device has moved from the first location;

wherein in response to the low power processor determining that the device has not moved from the first location determined by the application processor, the low power processor is configured to provide the first location as the location of the device responsive to the second request;

wherein in response to the low power processor determining that the device has moved from the first location determined by the application processor, the low power processor is configured to determine a second location for the device, wherein the low power processor calculates the second location of the device using less power than that consumed by the application processor in determining the first location due to the low power processor being configured to consume less power than the first processor;

wherein the low power processor is further configured to, in response to the context logic determining that the device is stationary, enter a sleep state;

an accelerometer configured to:

detect motion of the device; and output accelerometer data describing the motion; and an accelerometer processor configured to:

input the accelerometer data; and in response to accelerometer data that indicates that the device is in motion, send a wake signal to the low power processor.

14. The device of claim 13, wherein the position update logic comprises wake logic configured to, when a wake criteria is met, send a second wake signal to the application processor.

15. The device of claim 14, wherein the position update logic further comprises: context logic configured to determine a context of the device based, at least in part, on the position-related data; and wherein the wakeup logic evaluates the determined context to determine whether the wake criteria is met.

16. The device of claim 13, further comprising:

a Global Navigation Satellite System (GNSS) receiver configured to acquire GNSS measurements used to calculate the first location of the device, wherein the update logic is configured to:

set a first duty cycle according to which the GNSS receiver acquires GNSS measurements when the device is outdoors;

set a second duty cycle according to which the GNSS receiver acquires GNSS measurements when the device is indoors; and wherein the first duty cycle specifies that the GNSS receiver acquires GNSS measurements more frequently than the second duty cycle.

17. The device of claim 16, wherein the low power processor comprises the GNSS receiver and the low power processor transmits the GNSS measurements to the application processor for use in determining the location of the device.

* * * * *